(12) United States Patent
Ichii

(10) Patent No.: US 8,755,716 B2
(45) Date of Patent: Jun. 17, 2014

(54) LIGHT SOURCE DEVICE, OPTICAL SCANNING DEVICE, AND IMAGE FORMING APPARATUS

(75) Inventor: Daisuke Ichii, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 520 days.

(21) Appl. No.: 13/015,252

(22) Filed: Jan. 27, 2011

(65) Prior Publication Data

US 2011/0199454 A1 Aug. 18, 2011

(30) Foreign Application Priority Data

Feb. 18, 2010 (JP) ................................. 2010-033071

(51) Int. Cl.
G03G 15/04 (2006.01)
G03G 21/16 (2006.01)

(52) U.S. Cl.
USPC .......................................... 399/118; 399/191

(58) Field of Classification Search
None
See application file for complete search history.

(56) References Cited

U.S. PATENT DOCUMENTS

| | | | |
|---|---|---|---|
| 5,432,537 A * | 7/1995 | Imakawa et al. ............. 347/135 |
| 7,218,432 B2 | 5/2007 | Ichii et al. |
| 7,417,777 B2 | 8/2008 | Saisho et al. |
| 7,443,558 B2 | 10/2008 | Sakai et al. |
| 7,545,547 B2 | 6/2009 | Hayashi et al. |
| 7,554,708 B2 | 6/2009 | Sakai et al. |
| 7,586,661 B2 | 9/2009 | Ichii |
| 7,623,280 B2 | 11/2009 | Hirakawa et al. |
| 7,626,744 B2 | 12/2009 | Arai et al. |
| 7,663,657 B2 | 2/2010 | Ichii et al. |
| 7,672,032 B2 | 3/2010 | Hayashi et al. |
| 7,687,762 B2 | 3/2010 | Watanabe et al. |
| 7,710,445 B2 * | 5/2010 | Amada et al. ................. 347/238 |
| 7,738,007 B2 | 6/2010 | Ichii et al. |
| 7,800,805 B2 | 9/2010 | Hayashi et al. |
| 8,259,379 B2 | 9/2012 | Masuda |
| 2007/0058232 A1 | 3/2007 | Nakajima |
| 2007/0211325 A1 | 9/2007 | Ichii |
| 2007/0253047 A1 | 11/2007 | Ichii et al. |
| 2007/0253048 A1 | 11/2007 | Sakai et al. |
| 2008/0055672 A1 | 3/2008 | Watanabe et al. |

(Continued)

FOREIGN PATENT DOCUMENTS

| | | | |
|---|---|---|---|
| JP | 5-19197 A | 1/1993 |
| JP | 05019197 A * | 1/1993 | ............. G02B 26/10 |
| JP | 6-118319 A | 4/1994 |
| JP | 6-210896 A | 8/1994 |
| JP | 7-168117 A | 7/1995 |
| JP | 9-172225 A | 6/1997 |
| JP | 2002-40350 | 2/2002 |
| JP | 2007-79295 | 3/2007 |
| JP | 2009-20203 A | 1/2009 |
| JP | 2009020203 A * | 1/2009 |
| JP | 2009-65064 | 3/2009 |

OTHER PUBLICATIONS

Office Action issued Apr. 12, 2013, in Japanese Patent Application No. 2010-033071.

Primary Examiner — Clayton E Laballe
Assistant Examiner — Victor Verbitsky
(74) Attorney, Agent, or Firm — Oblon, Spivak, McClelland, Maier & Neustadt, L.L.P.

(57) ABSTRACT

A light source device includes: a light source; a package member that holds the light source; a splitting element that is arranged on an optical path of a light beam output from the light source and splits the light beam into a first light beam and a second light beam; and a cap member that holds the splitting element so that the surface of the splitting element is inclined with respect to a plane orthogonal to a traveling direction of the light beam output from the light source and that is attached to the package member to seal the light source.

13 Claims, 16 Drawing Sheets

(56) References Cited

U.S. PATENT DOCUMENTS

| | | |
|---|---|---|
| 2008/0068690 A1 | 3/2008 | Ichii |
| 2008/0123159 A1 | 5/2008 | Hayashi et al. |
| 2008/0192319 A1 | 8/2008 | Miyatake et al. |
| 2008/0212999 A1 | 9/2008 | Masuda et al. |
| 2008/0267663 A1 | 10/2008 | Ichii et al. |
| 2009/0015896 A1* | 1/2009 | Masuda ........................ 359/205 |
| 2009/0065685 A1 | 3/2009 | Watanabe et al. |
| 2009/0175657 A1 | 7/2009 | Yoshii et al. |
| 2009/0195849 A1 | 8/2009 | Ichii et al. |
| 2009/0295900 A1 | 12/2009 | Ichii |
| 2009/0315967 A1 | 12/2009 | Hayashi et al. |
| 2010/0060712 A1 | 3/2010 | Sato et al. |
| 2010/0195681 A1 | 8/2010 | Tatsuno et al. |
| 2010/0214633 A1 | 8/2010 | Sato et al. |

* cited by examiner

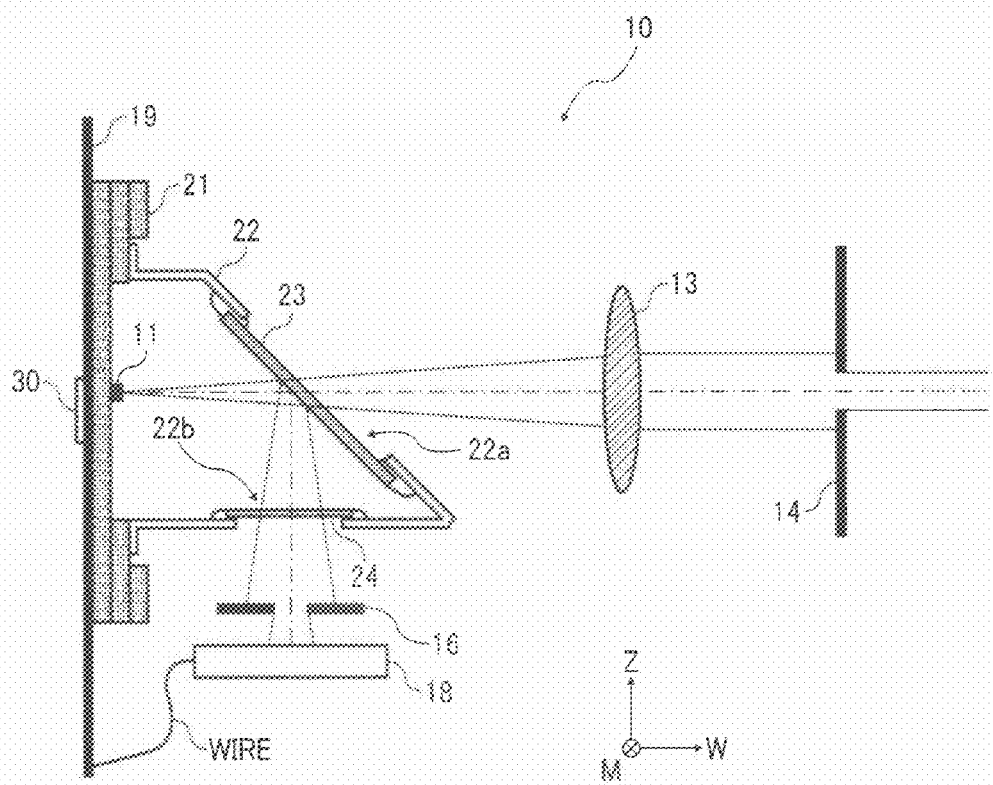

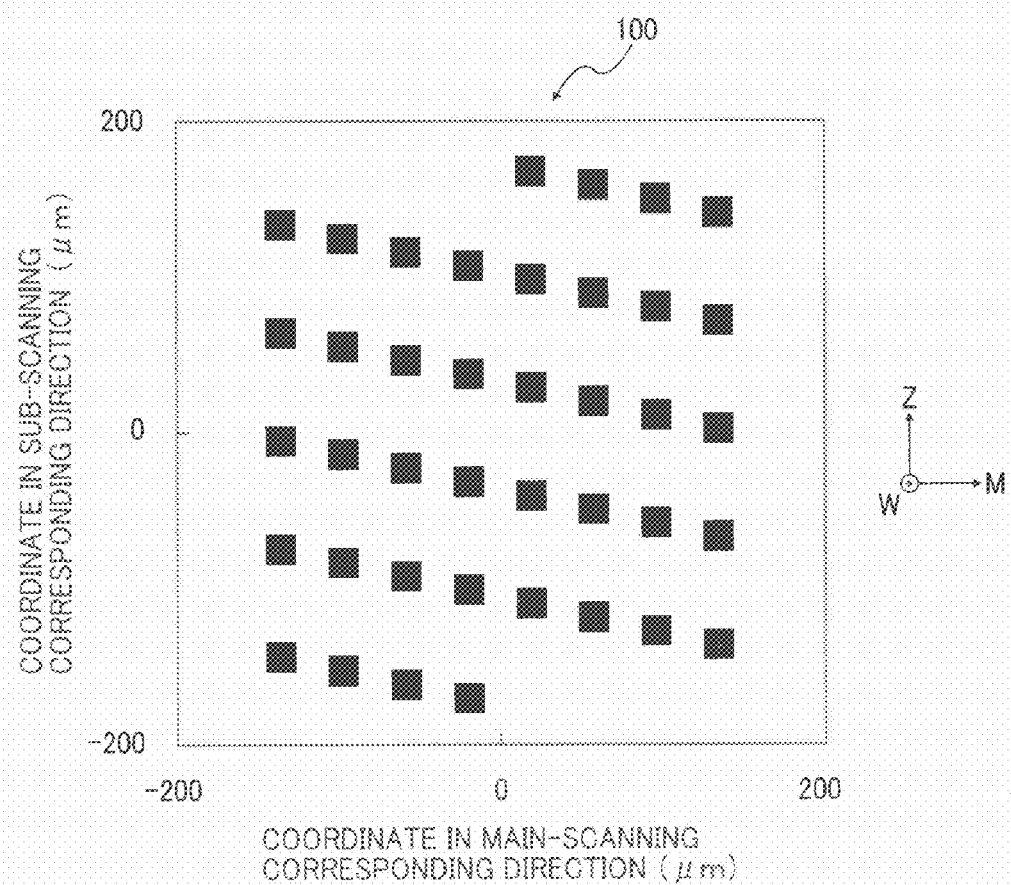

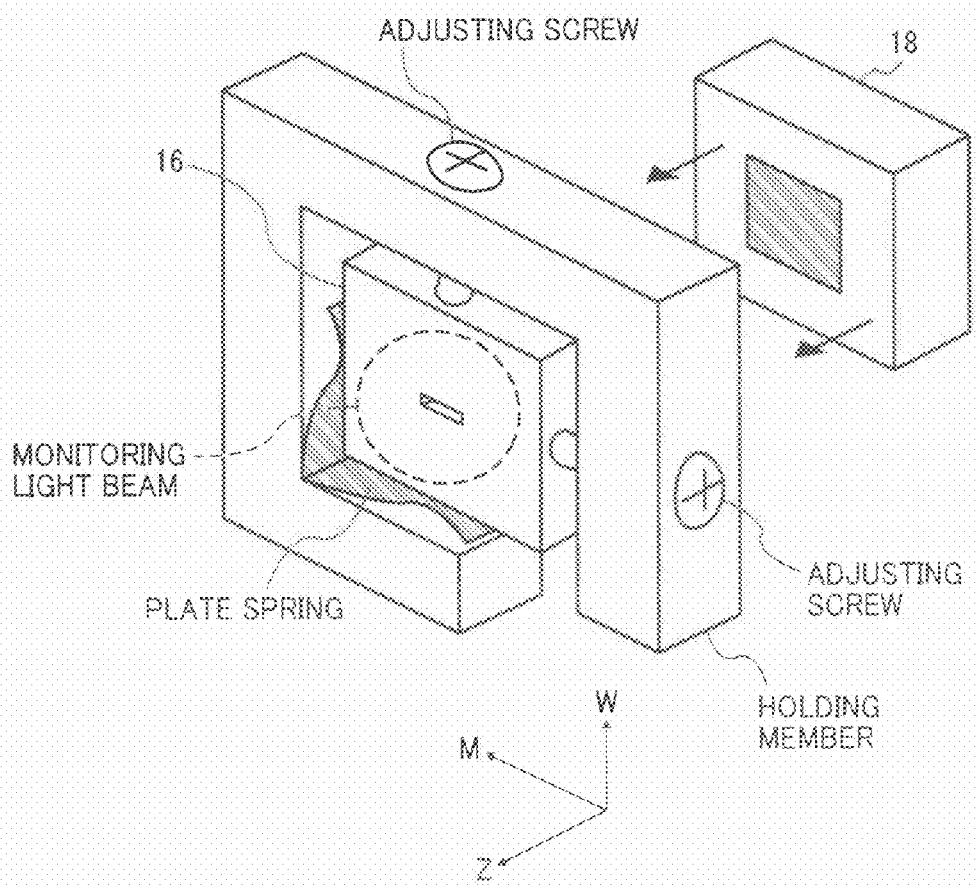

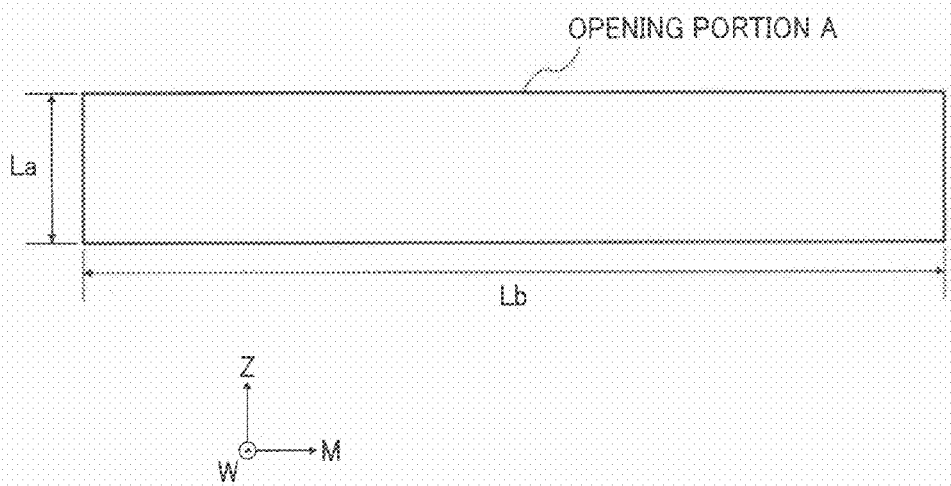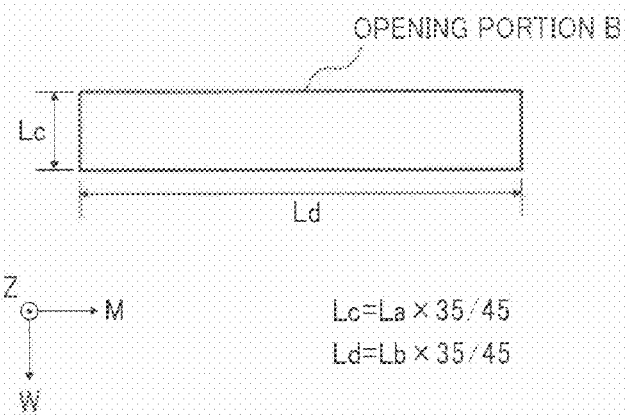

LIGHT SOURCE DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2010-033071 filed in Japan on Feb. 18, 2010.

BACKGROUND OF THE INVENTION

1. Field of the Invention

The present invention relates to a light source device, an optical scanning device, and an image forming apparatus. More specifically, the present invention relates to a light source device that emits laser light, an optical scanning device that includes the light source device, and an image forming apparatus that includes the optical scanning device.

2. Description of the Related Art

Image forming apparatuses employing a laser as a light source are widely used for electrophotographic image recording. Such image forming apparatuses include an optical scanning device that scans the surface of the photosensitive element with a light beam (a writing light beam) output from the light source and deflected by the deflector to form latent images on the surface of the photosensitive element. In image forming apparatuses, the light amount of a writing light beam is changed with changing temperature or over time, which may cause inconsistencies in density of final output images (output images).

A conventional optical scanning device employing an edge-emitting laser monitors light backwardly output from the edge-emitting laser and performs auto power control (APC) for suppressing light output fluctuation. However, a surface-emitting laser does not backwardly emit light because of its structure, and therefore, an optical scanning device employing a surface-emitting laser requires light amount control different from the conventional APC. A method for performing APC based on the output of a light detector that is obtained by branching a part of a light beam output from a surface-emitting laser using an optical element such as a beam splitter and a half mirror and guiding it to the light detector has been devised as a light amount control method using a surface-emitting laser.

For example, Japanese Patent Application Laid-open No. 2002-040350 discloses an optical scanning device in which while a deflector deflects a laser beam output from a surface-emitting laser and collimated by a collimator lens to subject a surface to be scanned to scanning exposure, a beam splitting unit reflects a part of the laser beam to make a photoreceptor detect a light amount. The optical scanning device includes an aperture that collimates the laser beam at a position between the beam splitting unit and the collimator lens.

Japanese Patent Application Laid-open No. 2007-079295 discloses a multi-beam light source apparatus that includes: a light source unit with a plurality of luminous sources monolithically arranged in a direction of main scanning; a coupling lens for converting a plurality of optical beams output from the light source unit into a predetermined convergence state; and a supporting member for supporting the light source unit and the coupling lens in one body. In the multi-beam light source apparatus, the supporting member includes: a first member that supports the coupling lens and is installed such that a rotational adjustment is possible for centering an optical axis of the optical beams output from the light source unit; and a second member that supports the light source unit and is installed so that an inclination of the first member in a main scanning plane can be adjusted.

Japanese Patent Application Laid-open No. 2009-065064 discloses a monitoring device that includes: an optical element having a first aperture arranged such that a first portion of the light beam output from a light source and having maximum intensity passes through a substantial center of the first aperture, and a reflecting portion arranged around the first aperture such that the reflecting portion reflects a second portion of the light beam as a monitoring light beam; an aperture member having a second aperture that shapes a beam diameter of the monitoring light beam reflected by the optical element; and a light-receiving element that receives the monitoring light beam coming through the second aperture.

However, the optical scanning device disclosed in Japanese Patent Application Laid-open No. 2002-040350 and the monitoring device disclosed in Japanese Patent Application Laid-open No. 2009-065064 have disadvantages such that the optical path length from the light source to the light detector becomes long to disturb downsizing of the devices.

Moreover, the multi-beam luminous source apparatus disclosed in Japanese Patent Application Laid-open No. 2007-079295 has disadvantages such that the accuracy of APC is largely influenced by the fluctuation of the divergence angle.

Typically, a semiconductor laser is mounted on a package, and a cover glass is provided at the front of the package for dust proofing. Light that is output from the semiconductor laser and is reflected by the cover glass enters the semiconductor laser as a feedback light and deteriorates the light stability of the laser. The deterioration of light-emitting properties due to the feedback light becomes prominent particularly in a semiconductor laser in which a plurality of light-emitting elements is closely spaced like a vertical cavity surface-emitting laser (VCSEL) array.

For this reason, removal of the cover glass can be considered. However, the removal causes disadvantages such that dust adheres to the semiconductor laser to lower the light output or to shorten the service life of the light source in a mounting and assembling process or under the conditions of use in the market.

SUMMARY OF THE INVENTION

It is an object of the present invention to at least partially solve the problems in the conventional technology.

According to the present invention, there is provided a light source device including: a light source; a package member that holds the light source; a splitting element that is arranged on an optical path of a light beam output from the light source and splits the light beam into a first light beam and a second light beam; and a cap member that holds the splitting element so that the surface of the splitting element is inclined with respect to a plane orthogonal to a traveling direction of the light beam output from the light source and that is attached to the package member to seal the light source.

According to another aspect of the present invention, there is provided an optical scanning device that scans a surface to be scanned with a light beam in a main-scanning direction, the optical scanning device including: the light source device; a deflector that deflects the light beam output from the light source device; and a scanning optical system that condenses the light beam deflected by the deflector on the surface to be scanned.

According to still another aspect of the present invention, there is provided an image forming apparatus including: at least one image carrier; and at least one optical scanning device according to claim 12 that scans the at least one image carrier using a light beam modulated according to image information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of a light source device illustrated in FIG. 2;

FIG. 4 is a schematic diagram of a two-dimensional array light-emitting device included in a light source illustrated in FIG. 3;

FIG. 5 is a schematic diagram of a positioning mechanism for positioning a second opening plate illustrated in FIG. 3;

FIG. 9A is a schematic diagram for explaining the shape of the opening portion A in the embodiment;

FIG. 9B is a schematic diagram for explaining the shape of the opening portion B in the embodiment;

DETAILED DESCRIPTION OF THE PREFERRED EMBODIMENTS

Figure 1:
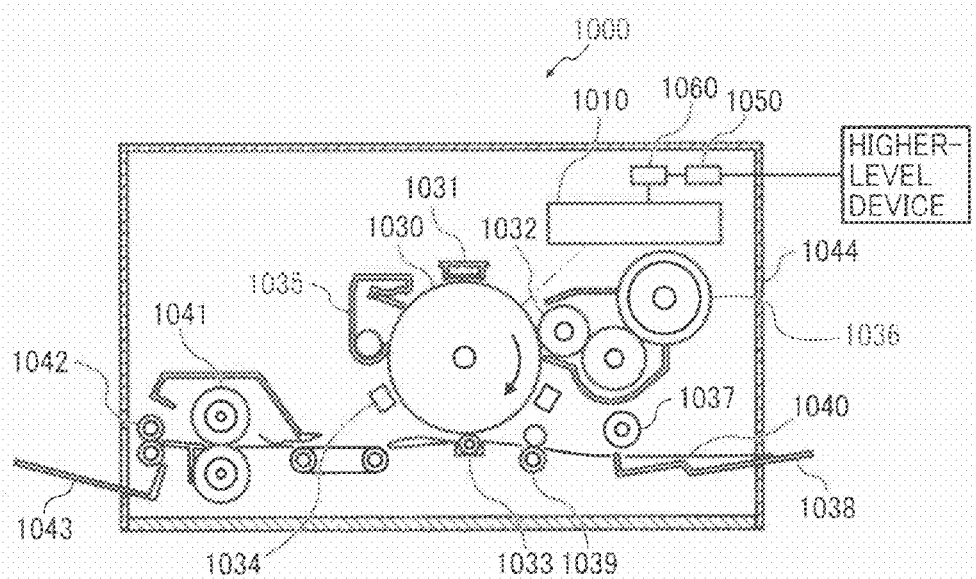
FIG. 1 is a schematic diagram of a laser printer according to an embodiment of the present invention.

Preferred embodiments of the present invention is described below with reference to FIGS. 1 to 13. FIG. 1 is a schematic diagram of a laser printer 1000 serving as an image forming apparatus according to an embodiment of the present invention.

The laser printer 1000 includes an optical scanning device 1010, a photosensitive drum 1030, an electric charger 1031, a developing roller 1032, a transfer charger 1033, a neutralization unit 1034, a cleaning unit 1035, a toner cartridge 1036, a feeding roller 1037, a paper feed tray 1038, a pair of registration rollers 1039, a fixing roller 1041, a discharging roller 1042, a discharge tray 1043, a communication control device 1050, and a printer control device 1060 that collectively controls each of the units described above. These are housed in a printer housing 1044 at predetermined positions.

The communication control device 1050 controls two-way communication between the laser printer 1000 and a higher-level device (a personal computer, for example) via a network or the like.

The photosensitive drum 1030 is a cylindrical member and has a photosensitive layer formed on the surface thereof. In other words, the surface of the photosensitive drum 1030 is a surface to be scanned. The photosensitive drum 1030 rotates in an arrow direction illustrated in FIG. 1.

The electric charger 1031, the developing roller 1032, the transfer charger 1033, the neutralization unit 1034, and the cleaning unit 1035 are arranged near the surface of the photosensitive drum 1030. The electric charger 1031, the developing roller 1032, the transfer charger 1033, the neutralization unit 1034, and the cleaning unit 1035 are arranged in this order along the rotation direction of the photosensitive drum 1030.

The electric charger 1031 uniformly charges the surface of the photosensitive drum 1030.

The optical scanning device 1010 irradiates the surface of the photosensitive drum 1030 charged by the electric charger 1031 with a light beam modulated based on image information received from the upper-level device. As a result, a latent image corresponding to the image information is formed on the surface of the photosensitive drum 1030. The latent image formed in this process moves in a direction of the developing roller 1032 according to the rotation of the photosensitive drum 1030. The structure of the optical scanning device 1010 is described later.

Toner is stored in the toner cartridge 1036 and is supplied to the developing roller 1032.

The developing roller 1032 makes the toner supplied from the toner cartridge 1036 adhere to the latent image formed on the surface of the photosensitive drum 1030 to visualize the image information. The latent image to which the toner is adhered (hereinafter, also referred to as a "toner image" for convenience) moves in a direction of the transfer charger 1033 according to the rotation of the photosensitive drum 1030.

The paper feed tray 1038 stores therein a recording sheet 1040. The feeding roller 1037 is arranged near the paper feed tray 1038, takes out the recording sheet 1040 from the paper feed tray 1038 one by one, and conveys the sheet to the pair of registration rollers 1039. The pair of registration rollers 1039 once holds the recording sheet 1040 taken out by the feeding roller 1037 and sends out the recording sheet 1040 into the gap between the photosensitive drum 1030 and the transfer charger 1033 according to the rotation of the photosensitive drum 1030.

Voltage having a polarity opposite to that of the toner is applied to the transfer charger 1033 in order to electrically attract the toner on the surface of the photosensitive drum 1030 to the recording sheet 1040. The toner image on the surface of the photosensitive drum 1030 is transferred onto the recording sheet 1040 with this voltage. The recording sheet 1040 transferred in this process is sent to the fixing roller 1041.

The fixing roller 1041 applies heat and pressure onto the recording sheet 1040, and thus, the toner is fixed on the recording sheet 1040. The recording sheet 1040 fixed in this process is sent to the discharge tray 1043 via the discharging roller 1042 and is sequentially stacked on the discharge tray 1043.

The neutralization unit 1034 neutralizes the surface of the photosensitive drum 1030.

The cleaning unit 1035 removes the toner (residual toner) remaining on the surface of the photosensitive drum 1030. The surface of the photosensitive drum 1030 from which the residual toner is removed returns to a position facing the electric charger 1031 again.

The structure of the optical scanning device 1010 is described below.

Figure 2:
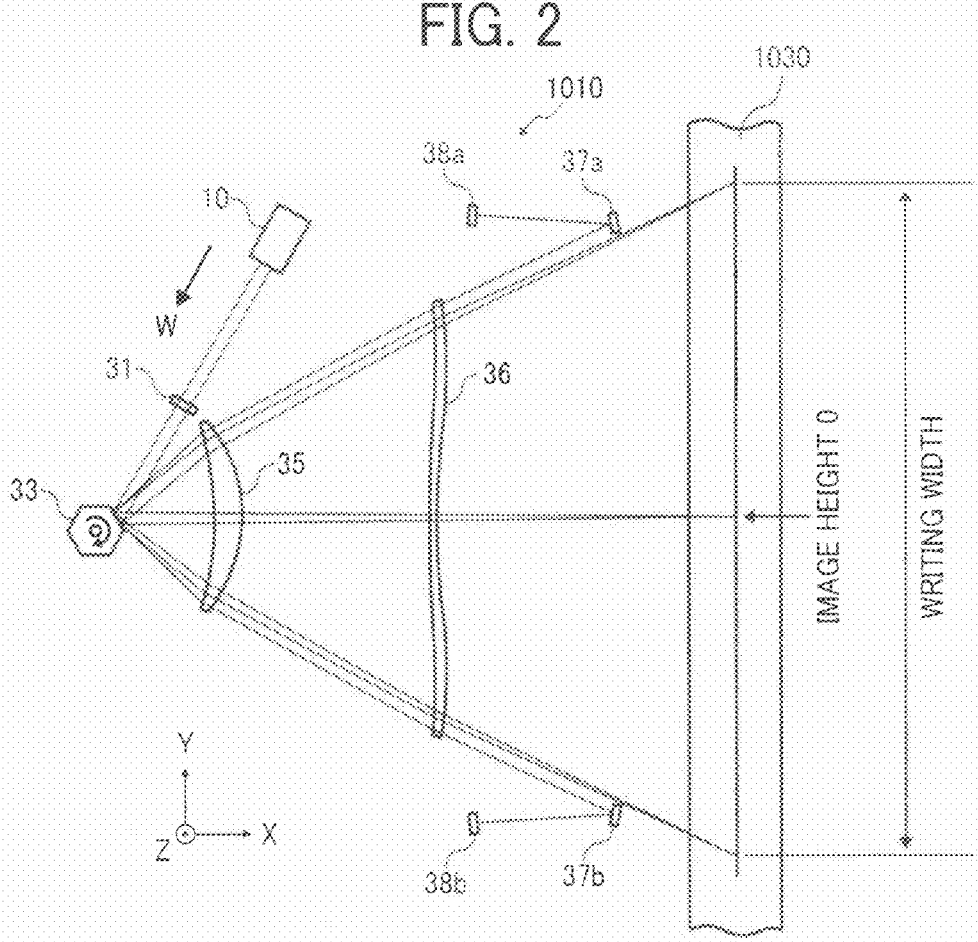
FIG. 2 is a schematic diagram of an optical scanning device illustrated in FIG. 1.

As illustrated in FIG. 2 as one example, the optical scanning device 1010 includes a light source device 10, a cylindrical lens 31, a polygon mirror 33, a deflector side-scanning lens 35, an image surface side-scanning lens 36, two light detection mirrors (37a and 37b), and two light detection sensors (38a and 38b).

The present specification describes, in an XYZ-three dimensional rectangular coordinate system, a direction along the longitudinal direction of the photosensitive drum 1030 as a Y-axis direction and a direction along the optical axis of each of the scanning lenses 35 and 36 as an X-axis direction. The traveling direction of the light beam directing to the polygon mirror 33 from the light source device 10 is described as a "W direction" hereinafter for convenience.

The direction corresponding to the main-scanning direction is abbreviated as a "main-scanning corresponding direction", and the direction corresponding to the sub-scanning direction is abbreviated as a "sub-scanning corresponding direction" hereinafter for convenience.

As illustrated in FIG. 3 as one example, the light source device 10 includes a light source 11, a package member 21, a cap member 22, a coupling lens 13, a first opening plate 14, a second opening plate 16, a photoreceptor 18, and a light source control device 30. The package member 21 and the light source control device 30 are mounted on a single circuit board 19. An "M direction" illustrated in FIG. 3 is a main-scanning corresponding direction at the light source 11.

In FIG. 3, the package member 21 and the light source control device 30 are mounted on the surfaces of the circuit board 19 in the +W direction and the −W direction, respectively.

The package member 21 is a flat package called a ceramic leaded chip carrier (CLCC) and has a spacial area whose periphery is surrounded by a wall in the +W direction. The light source 11 is held at the central bottom of the spacial area.

As illustrated in FIG. 4 as one example, the light source 11 includes a two-dimensional array light-emitting device 100 that is formed on a single board and in which forty light-emitting elements are two-dimensionally arrayed.

These forty light-emitting elements are arrayed so as to be spaced uniformly when all of the light-emitting elements are orthographically projected on virtual lines extending in a sub-scanning corresponding direction (direction same as a Z-axis direction in this case). In the present specification, a "light-emitting element interval" means a distance between the centers of two light-emitting elements.

Each of the light-emitting elements is a vertical cavity surface-emitting laser (VCSEL) having an oscillation wavelength of a 780-nanometer band. In other words, the two-dimensional array light-emitting device 100 is a surface-emitting laser array including forty light-emitting elements.

The light source 11 is arranged so that the light beam is output in a +W direction.

Referring back to FIG. 3, the cap member 22 is a metallic member and is installed on the surface of the package member 21 in the +W direction to seal the spacial area. The cap member 22 is not limited to a metallic member so long as dust resistance can be ensured.

The cap member 22 has two windows (22a and 22b). The window 22a is provided in the +W direction of the light source 11 so as to be inclined 45 degrees with respect to the MZ plane and is covered by a half mirror 23.

The half mirror 23 is a plate-like member, and one surface of the half mirror 23 is parallel to the other surface thereof. The surfaces of the half mirror 23 are inclined 45 degrees with respect to the MZ plane.

The window 22b is provided in the −Z direction of the half mirror 23 and is covered by a transparent member 24.

Accordingly, while the light beam output from the light source 11 and passing through the half mirror 23 passes through the window 22a, the light beam reflected by the half mirror 23 passes through the window 22b.

The light beam passing through the half mirror 23 is also called a "writing light beam", and the light beam reflected by the half mirror 23 is also called a "monitoring light beam".

The coupling lens 13 is arranged on the optical path of the writing light beam. The writing light beam becomes a substantially parallel light by passing through the coupling lens 13. The coupling lens 13 is rotationally symmetric in the MZ plane and has equal optical power in both the M direction and the Z-axis direction.

The first opening plate 14 has an opening portion and is arranged on the optical path of the writing light beam via the coupling lens 13 to collimate the writing light beam.

The light beams passed through the opening portion of the first opening plate 14 mean light beams output from the light source device 10.

The second opening plate 16 has an opening portion and is arranged on the optical path of the monitoring light beam passing through the window 22b (transparent member 24) to collimate the monitoring light beam.

As illustrated in FIG. 5 as one example, the second opening plate 16 is fixed at an appropriate position with the positioning mechanism for positioning in the MW surface.

The positioning mechanism includes: a frame like holding member that surrounds the periphery of the second opening plate 16; a plate spring that is inserted between the second opening plate 16 and the inner wall of the holding member and that applies pressing force to the second opening plate 16 in the −M direction and the +W direction; and two adjusting screws that are installed in the holding member so as to oppose the plate spring and that make the second opening plate 16 move in the M direction and the W direction. The position of the second opening plate 16 is adjusted depending on the inserted amount of the two adjusting screws.

In this embodiment, the second opening plate 16 is adjusted to a position where the light amount received by the photoreceptor 18 reaches the maximum. In the position, the peak position of the light intensity of the light beam passing through the opening portion of the second opening plate 16 substantially corresponds to the center of the opening portion of the second opening plate 16.

Referring back to FIG. 3, the photoreceptor 18 receives the light beam passing through the opening portion of the second opening plate 16.

The photoreceptor 18 outputs an electrical signal corresponding to the amount of received light. The electrical signal is sent to the circuit board 19 via a wire and is supplied to the light source control device 30.

The optical system arranged on the optical path between the half mirror 23 and the photoreceptor 18 is also called a monitoring optical system. In the present embodiment, the monitoring optical system includes the transparent member 24 and the second opening plate 16.

In the light source device 10, the half mirror 23 is inclined with respect to the MZ plane, and thus, the light beam reflected at the surface of the half mirror 23 can be restrained from returning to the light source 11. In other words, the influence of a feedback light can be reduced.

The light source 11 is sealed with the cap member 22, and thus, the adhesion of dust to the two-dimensional array light-emitting device 100 can be prevented.

The opening portion of the first opening plate 14 and the opening portion of the second opening plate 16 are described below. The opening portion of the first opening plate 14 is called an "opening portion A", and the opening portion of the second opening plate 16 is called an "opening portion B", hereinafter for convenience.

Figure 6A:
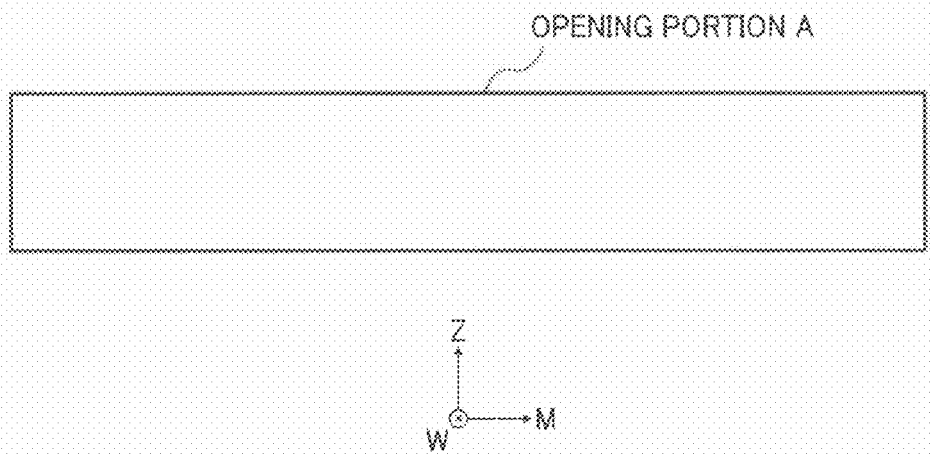
FIG. 6A is a schematic diagram for explaining the shape of an opening portion A in the embodiment.
Figure 6B:
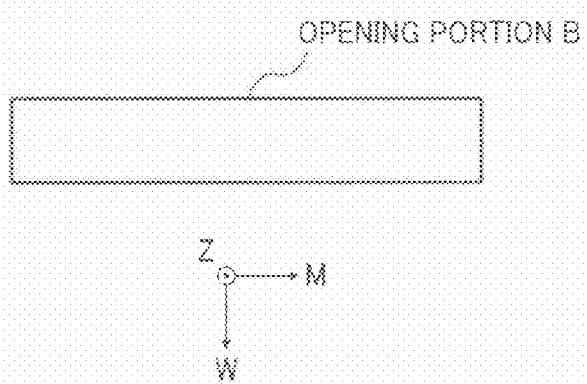
FIG. 6B is a schematic diagram for explaining the shape of an opening portion B in the embodiment.

Both shapes of the opening portion A and the opening portion B are rectangles and are similar to each other (see FIGS. 6A and 6B). Each of the opening plates is arranged so that the peak position of the light intensity substantially corresponds to the center of the opening portion.

In the spacial light intensity distribution of the light beam passing through the opening portion A, regarding two directions (the M direction and the Z-axis direction in this embodiment) orthogonal to each other in a surface (the MZ plane in this embodiment) orthogonal to the traveling direction of the light beam passing through the opening portion A, the light intensity at the edge in one direction (the M direction in this embodiment) relative to the maximum light intensity is indicated by P1, and the light intensity at the edge in the other direction (the Z-axis direction in this embodiment) relative to the maximum light intensity is indicated by P2. In the first opening plate 14, the M direction is a main-scanning corresponding direction, and the Z-axis direction is a sub-scanning corresponding direction.

In the spacial light intensity distribution of the light beam passing through the opening portion B, regarding two directions (the M direction and the W direction in this embodiment) orthogonal to each other in a surface (the MW surface in this embodiment) orthogonal to the traveling direction of the light beam passing through the opening portion B, the light intensity at the edge in one direction (the M direction in this embodiment) relative to the maximum light intensity is indicated by P3, and the light intensity at the edge of the distribution in the other direction (the W direction in this embodiment) relative to the maximum light intensity is indicated by P4. In the second opening plate 16, the M direction is a main-scanning corresponding direction, and the W direction is a sub-scanning corresponding direction.

In this embodiment, the shapes of the opening portion A and the opening portion B are set so as to satisfy the relationships of $P1 \approx P3$ and $P2 \approx P4$ (hereinafter, also referred to as a "light intensity equivalence relation" for convenience) (see FIG. 7).

Figure 7:
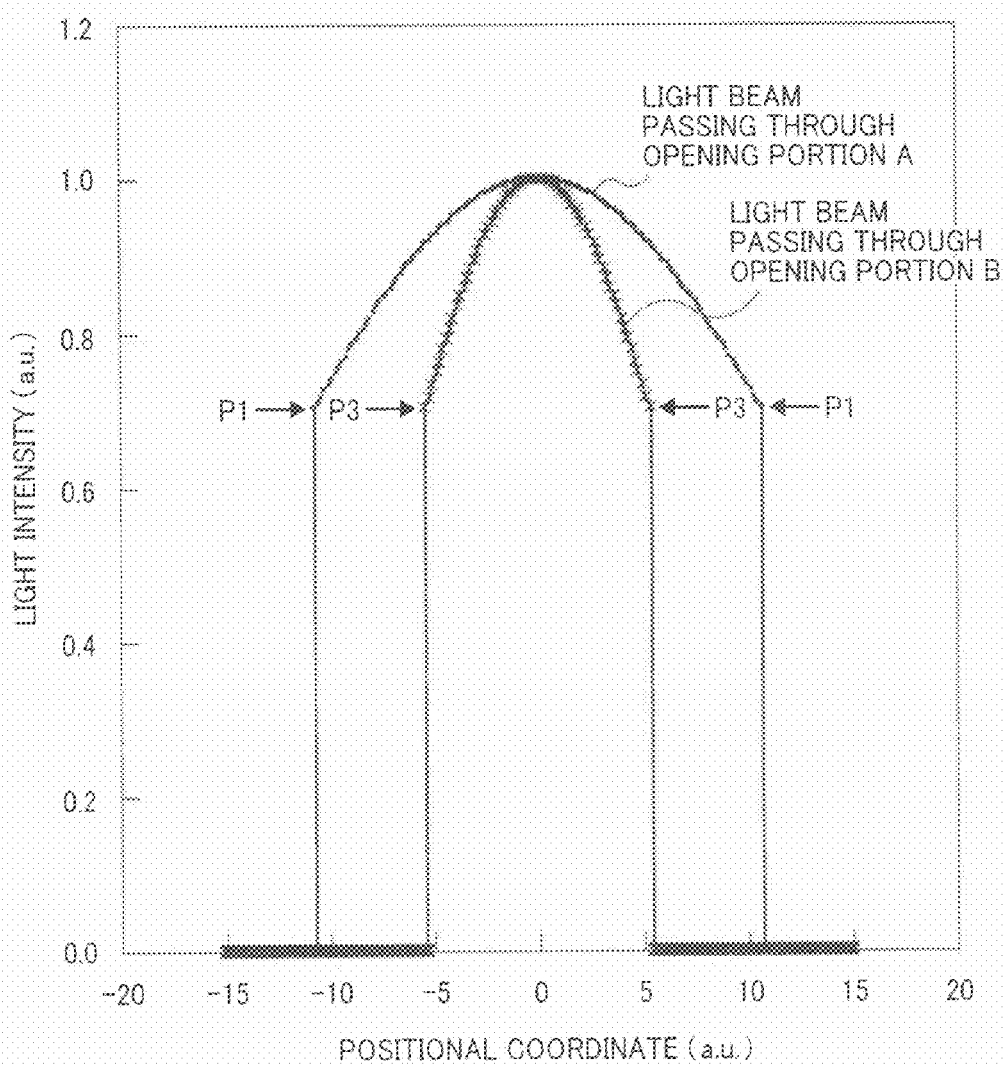
FIG. 7 is a graph of spacial light intensity distribution of a writing light beam and a monitoring light beam in the embodiment.

In FIG. 7, the horizontal axis indicates the longitudinal direction (main-scanning corresponding direction) of the opening portions, and the position 0 indicates the peak position of the light intensity. The vertical axis in FIG. 7 indicates a light intensity normalized with the peak value. $P1 \approx P3$ is satisfied in FIG. 7.

Although the broadenings of the writing light beam and the monitoring light beam are different from each other because their optical systems and length of optical paths are different, the normalized light intensities of the writing light beam and the monitoring light beam at the edges of the opening portions where the light beams are blocked are equal to each other. This state is maintained in both of the longitudinal direction (main-scanning corresponding direction) and the lateral direction (sub-scanning corresponding direction) of the opening portions. This enables the writing light beam and the monitoring light beam to be equally affected by the fluctuation of the divergence angle of the light beam output from the two-dimensional array light-emitting device 100.

In the present embodiment, the size of the opening portion A is 5.6 millimeters in the M direction and 1.2 millimeters in the Z-axis direction. The size of the opening portion B is 4.4 millimeters in the M direction and 0.9 millimeter in the W direction.

Figure 8:
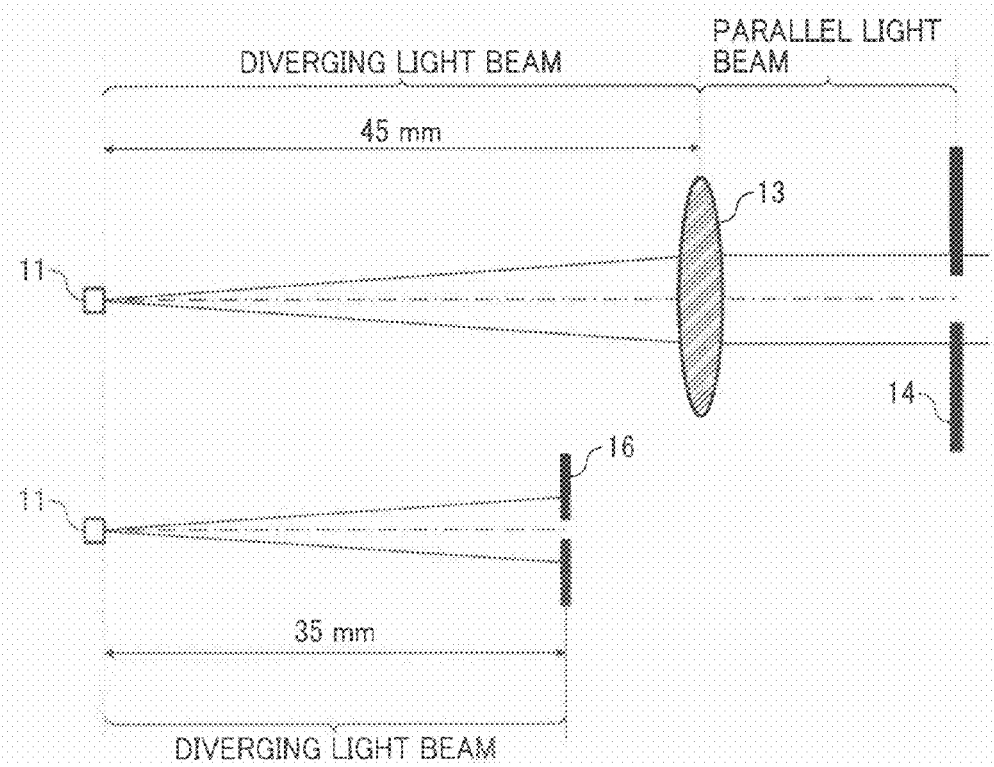
FIG. 8 is a schematic diagram for explaining relationship between the shape of the opening portion A and the shape of the opening portion B in the embodiment.

As illustrated in FIG. 8, the focal length of the coupling lens 13 is 45 millimeters, and the optical path length from the light source 11 to the second opening plate 16 is 35 millimeters. In FIG. 8, the cap member 22, the half mirror 23, and the transparent member 24 are not illustrated.

With this structure, the ratio of the distance that a light beam travels while diverging from the light source 11 to the first opening plate 14 and the distance that a light beam travels while diverging from the light source 11 to the second opening plate 16 is equal to the ratio of the sizes of the opening portion A and the opening portion B.

In other words, as illustrated in FIGS. 9A and 9B, $Lc=La \times 35/45$ and $Ld=Lb \times 35/45$ are satisfied when La indicates the length of the opening portion A in the Z-axis direction, Lb indicates the length of the opening portion A in the M direction, Lc indicates the length of the opening portion B in the W direction, and Ld indicates the length of the opening portion B in the M direction.

Figure 10:
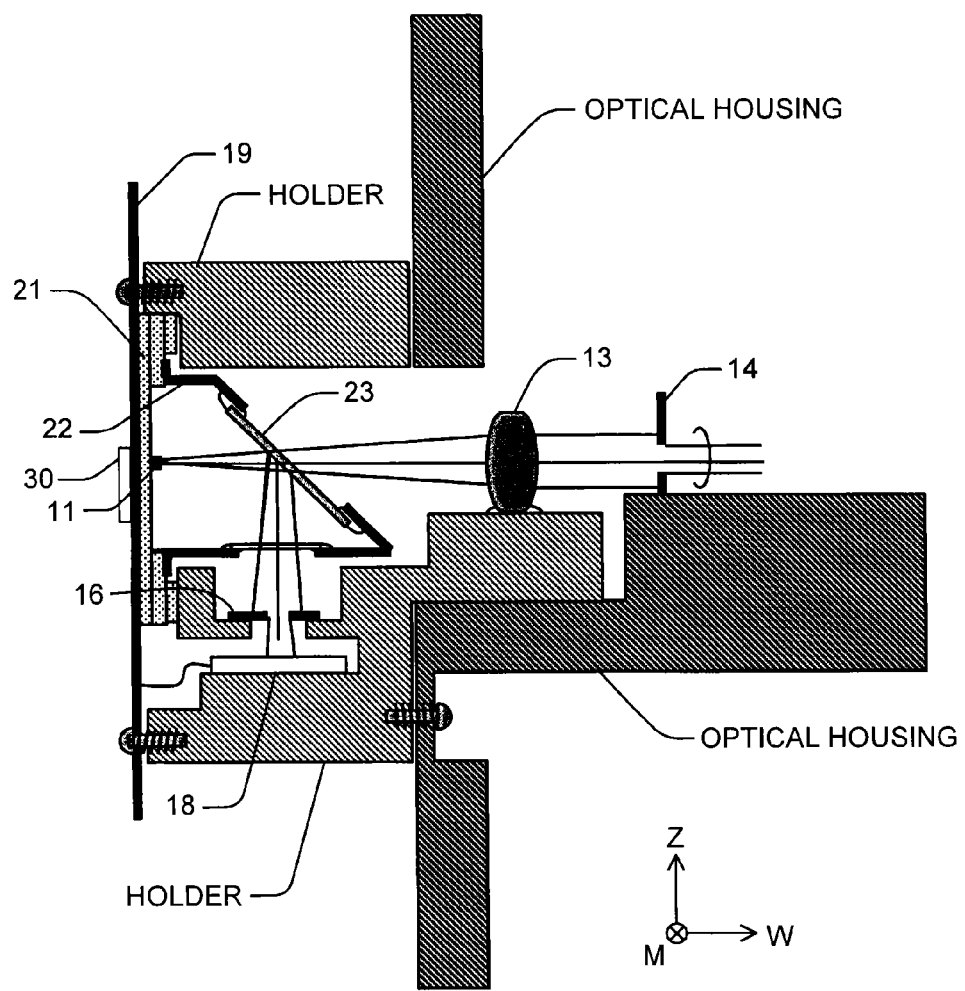
FIG. 10 is a schematic diagram of a state where the light source device is installed in an optical housing in the embodiment.

FIG. 10 illustrates a state where the light source device 10 is installed in an optical housing.

In this embodiment, aluminium die casting holder holds the coupling lens 13, the second opening plate 16, and the photoreceptor 18 in a predetermined positional relationship. The holder is engaged with the circuit board 19 with screws.

With this structure, the reference surface of the package member 21 abuts the holder in the M direction, the W direction, and the Z-axis direction to be positioned.

The position of the coupling lens 13 is adjusted so that the positional relationship with the light source 11 and the state of a writing light beam become desired states. Subsequently, the coupling lens 13 is bonded to the holder using a photo curing resin adhesive.

The photoreceptor 18 is inserted and fixed to the holder and is connected to the circuit board 19.

The second opening plate 16 is adjusted to a desired position while the photoreceptor 18 receives the light output from the light source 11, and then is held with a holding mechanism (not illustrated).

The optical housing may be made of either aluminium die casting or resin molding.

The holder is engaged with the optical housing with screws. In this structure, the holder is rotatable around an axis parallel to the W direction in order to adjust the position of the light source 11 relative to the scanning optical system mounted on the optical housing to a desired state.

The first opening plate 14 is held on the optical housing. The first opening plate 14 may be integrally held on the holder in order to enhance positional accuracy with the light source 11 and the coupling lens 13. In this case, attention is required to the deterioration of a beam spot diameter because the first opening plate 14 is also decentered from the optical system on the optical housing by rotationally adjusting the holder.

Figure 11:
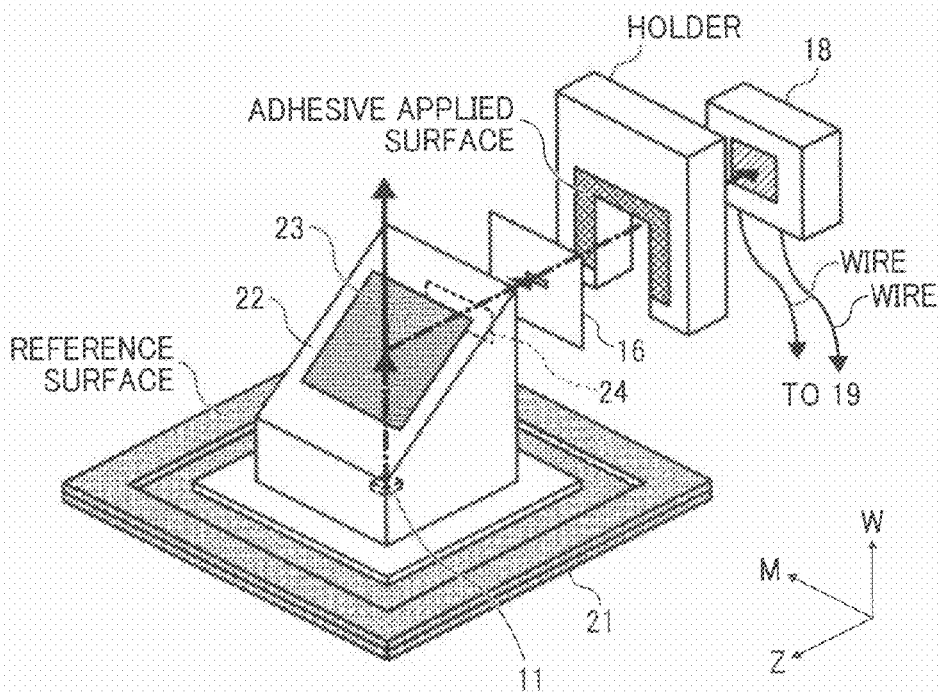
FIG. 11 is a schematic diagram for explaining assembly of the light source device in the embodiment.
Figure 12:
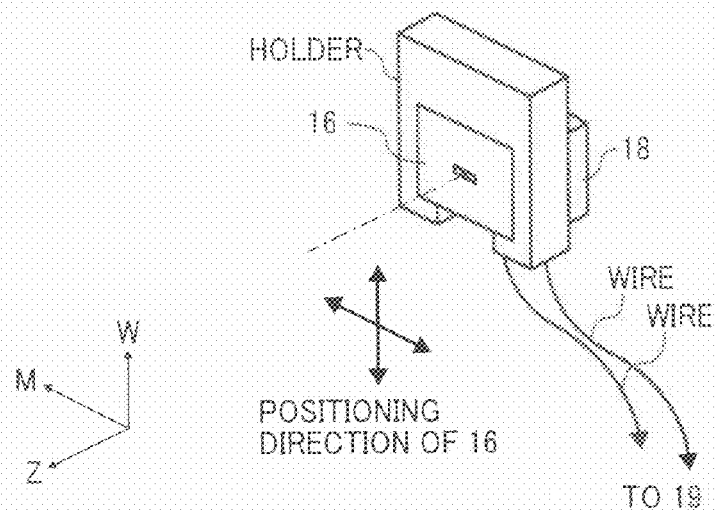
FIG. 12 is another schematic diagram for explaining assembly of the light source device in the embodiment.

As illustrated in FIGS. 11 and 12, an adhesive (such as an ultraviolet curable resin adhesive) can be applied to the surface of the holder where the second opening plate 16 is installed, and the second opening plate 16 can be positioned by holding the plate with an adjustment jig or in a similar manner and then be bonded to the holder. Thus, the optical scanning device can omit the positioning mechanism. Therefore, this structure enables downsizing, weight reduction, and cost reduction of the device.

Referring back to FIG. 2, the cylindrical lens 31 forms an image of the light beam passing through the opening portion of the first opening plate 14 of the light source device 10, that is, the light beam output from the light source device 10 near the deflection reflection surface of the polygon mirror 33 in the Z-axis direction.

The optical system arranged on the optical path between the light source 11 and the polygon mirror 33 is also referred to as a pre-deflector optical system. In the present embodiment, the pre-deflector optical system includes the half mirror 23, the coupling lens 13, the first opening plate 14, and the cylindrical lens 31.

As an example, the polygon mirror 33 includes a six-sided mirror having an inscribed circle radius of 25 millimeters in which each mirror serves as a deflection reflecting surface. The polygon mirror 33 deflects the light beams from the cylindrical lens 31 while rotating at a constant speed around an axis parallel to the Z-axis direction.

The scanning lens 35 of deflector side is arranged on the optical path of the light beam deflected by the polygon mirror 33.

The scanning lens 36 of image surface side is arranged on the optical path of the light beam passed through the scanning lens 35 of deflector side. The light beam passed through the scanning lens 36 of image surface side is emitted on the surface of the photosensitive drum 1030, and a light spot is formed thereon. The light spot moves in the longitudinal direction of the photosensitive drum 1030 according to the rotation of the polygon mirror 33. In other words, the light spot scans the photosensitive drum 1030. In this process, the movement direction of the light spot is a "main-scanning direction". The rotation direction of the photosensitive drum 1030 is a "sub-scanning direction".

The optical system arranged on the optical path at a position between the polygon mirror 33 and the photosensitive drum 1030 is also called a scanning optical system. In the present embodiment, the scanning optical system is constituted by the deflector side-scanning lens 35 and the image surface side-scanning lens 36. At least one reflecting mirror may be arranged on at least one of the optical path between the scanning lens 35 of deflector side and the scanning lens 36 of image surface side and the optical path between the scanning lens 36 of image surface side and the photosensitive drum 1030.

A part of the light beams before writing starts among the light beams that have been deflected by the polygon mirror 33 and have passed through the scanning optical system enters the photodetection sensor 38a via the photodetection mirror 37a. A part of the light beams after writing is finished among the light beams that have been deflected by the polygon mirror 33 and have passed through the scanning optical system enters the photodetection sensor 38b via the photodetection mirror 37b.

Each of the photodetection sensors outputs a signal depending on the amount of received light (a photoelectric conversion signal).

Figure 13:
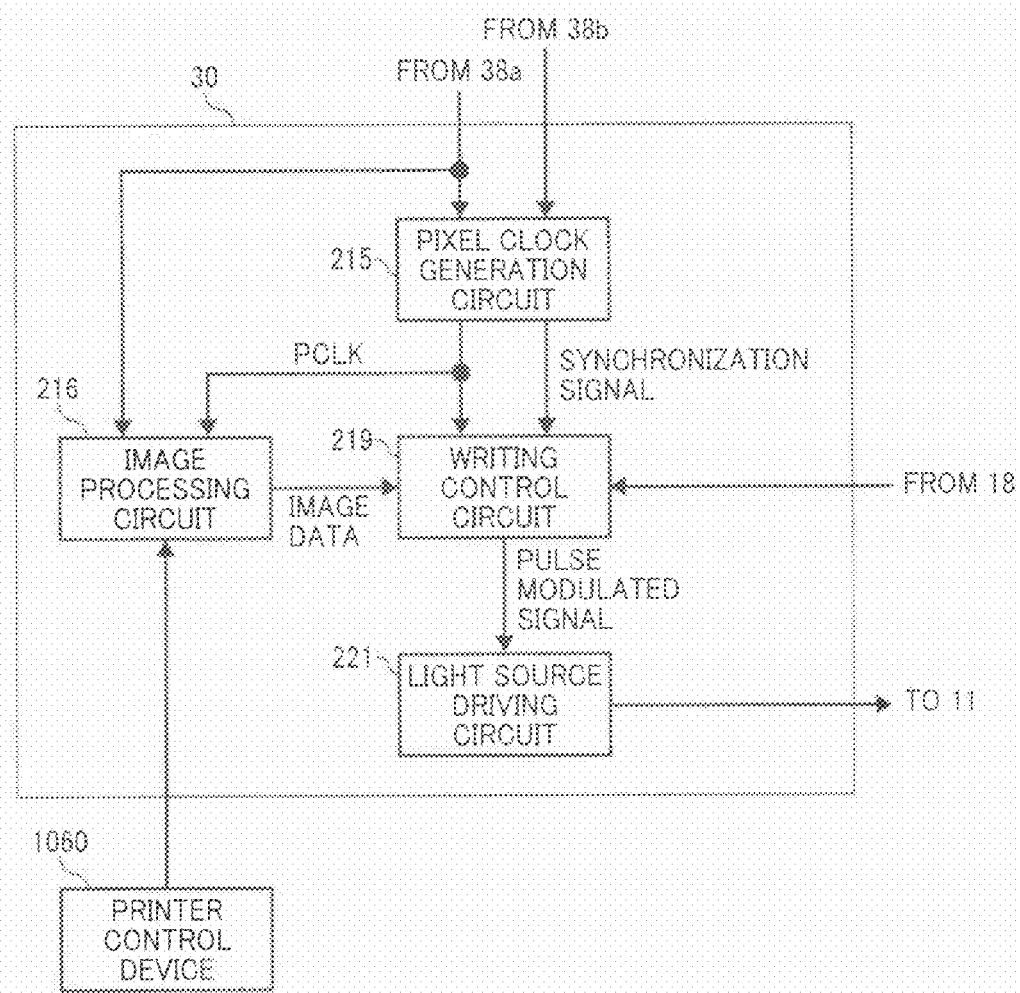
FIG. 13 is a schematic block diagram of a light source control device illustrated in FIG. 3.

As illustrated in FIG. 13 as one example, the light source control device 30 includes a pixel clock generation circuit 215, an image processing circuit 216, a writing control circuit 219, and a light source driving circuit 221. Arrows illustrated in FIG. 13 indicate representative signals or information flow and do not indicate the whole connection relationship of each block.

The pixel clock generation circuit 215 determines a time required for a light beam to scan between the photodetection sensors using an output signal of the photodetection sensor 38a and an output signal of the photodetection sensor 38b, sets a frequency so that a preset number of pulses is placed within the time, and thus generates a pixel clock signal PCLK of the frequency. Thus generated pixel clock signal PCLK is supplied to the image processing circuit 216 and the writing control circuit 219. The output signal of the photodetection sensor 38a is output to the writing control circuit 219 as a synchronization signal.

The image processing circuit 216 subjects image information received from the upper-level device via the printer control device 1060 to raster development, subjects the information to predetermined halftone processing and similar processing, and then produces image data representing tone of each image by each light-emitting element based on the pixel clock signal PCLK. The image processing circuit 216 detects the start of scanning based on the output signal of the photodetection sensor 38a and then outputs the image data to the writing control circuit 219 in synchronization with the pixel clock signal PCLK.

The writing control circuit 219 generates a pulse modulated signal based on the image data output from the image processing circuit 216, the pixel clock signal PCLK and the synchronization signal output from the pixel clock generation circuit 215. The writing control circuit 219 corrects the driving current of each light-emitting element at a predetermined timing based on the output signal of the photoreceptor 18 so that the light amount of the optical beam passing through the opening portion of the first opening plate 14 of the light source device 10 becomes a predetermined value. In other words, the writing control circuit 219 performs auto power control (APC).

The light source driving circuit 221 drives each light-emitting element of the two-dimensional array light-emitting device 100 based on the pulse modulated signal from the writing control circuit 219.

As is apparent from the description described above, the laser printer 1000 in the present embodiment includes the light source device 10. The half mirror 23 is structured as a splitting element.

As described above, the light source device 10 according to the present embodiment includes the light source 11 including the surface-emitting laser array, the package member 21 holding the light source 11, and the cap member 22 that is attached to the package member 21 and seals the light source 11.

The cap member 22 has two windows (22a and 22b). The window 22a is provided in the +W direction of the light source 11 so as to be inclined 45 degrees with respect to the MZ plane and is covered by the half mirror 23. The window 22b is provided in the −Z direction of the half mirror 23 and is covered by the transparent member 24.

While the writing light beam output from the light source 11 and passing through the half mirror 23 passes through the window 22a, the monitoring light beam reflected by the half mirror 23 passes through the window 22b.

This structure can prevents dust from adhering to the light source 11, and can inhibit the light beam reflected by the surface of the half mirror 23 from returning to the light source 11. Moreover, the monitoring light beam can be extracted from the vicinity of the light source 11 while sealing properties of the light source 11 is maintained.

The light source device 10 includes the first opening plate 14 on the optical path of the light beam passing through the window 22a and the second opening plate 16 on the optical path of the light beam passing through the window 22b. The opening portion of the first opening plate 14 and the opening portion of the second opening plate 16 are formed in shapes such that the writing light beam and the monitoring light beam satisfy the "light intensity equivalence relation". This enables the writing light beam and the monitoring light beam to be equally affected by the fluctuation of the divergence angle of the light beam output from the light source 11.

The photoreceptor 18 receives the light beam passing through the opening portion of the second opening plate 16 and outputs electrical signals corresponding to the amount of received light to the light source control device 30. Accordingly, APC can be performed. Therefore, the light source device 10 can emit stable light beams and can be downsized.

The optical scanning device 1010 according to the present embodiment includes the light source device 10 and thus can be downsized without lowering the scanning accuracy.

The light source 11 includes a plurality of light-emitting elements, and thus, a plurality of scans can be performed simultaneously to increase the speed of image formation.

The laser printer 1000 according to the present embodiment includes the optical scanning device 1010 and thus can be downsized without lowering the image quality.

The light source 11 includes a plurality of light-emitting elements and thus can achieve high image density.

Figure 14:
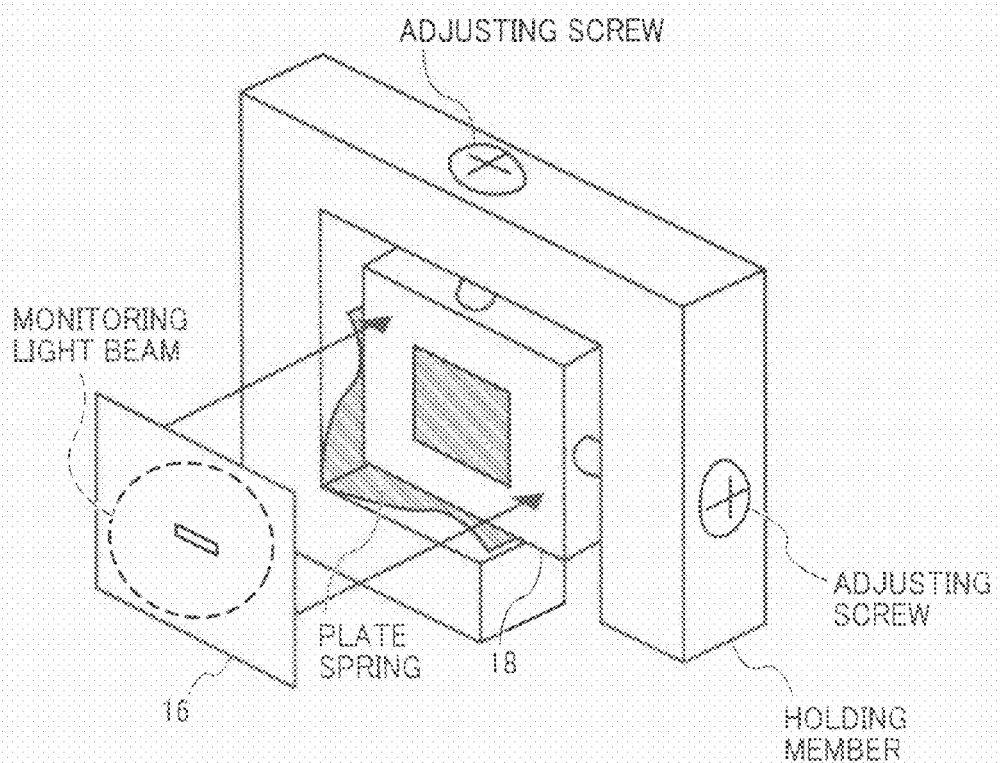
FIG. 14 is a schematic diagram of a positioning mechanism when the second opening plate and a photoreceptor illustrated in FIG. 3 are integrated.

In the embodiment described above, the second opening plate 16 and the photoreceptor 18 may also be integrated. With this structure, as illustrated in FIG. 14 as one example, the positioning mechanism of the second opening plate 16 includes: a frame like holding member that surrounds the periphery of the photoreceptor 18; a plate spring that is inserted between the photoreceptor 18 and the inner wall of the holding member and that applies pressing force to the photoreceptor 18 in the −M direction and the +W direction; and two adjusting screws that are installed in the holding member so as to oppose the plate spring and that make the photoreceptor 18 move in the M direction and the W direction. In this case, the position of the second opening plate 16 is adjusted together with the photoreceptor 18 depending on the inserted amount of the two adjusting screws.

Figure 15:
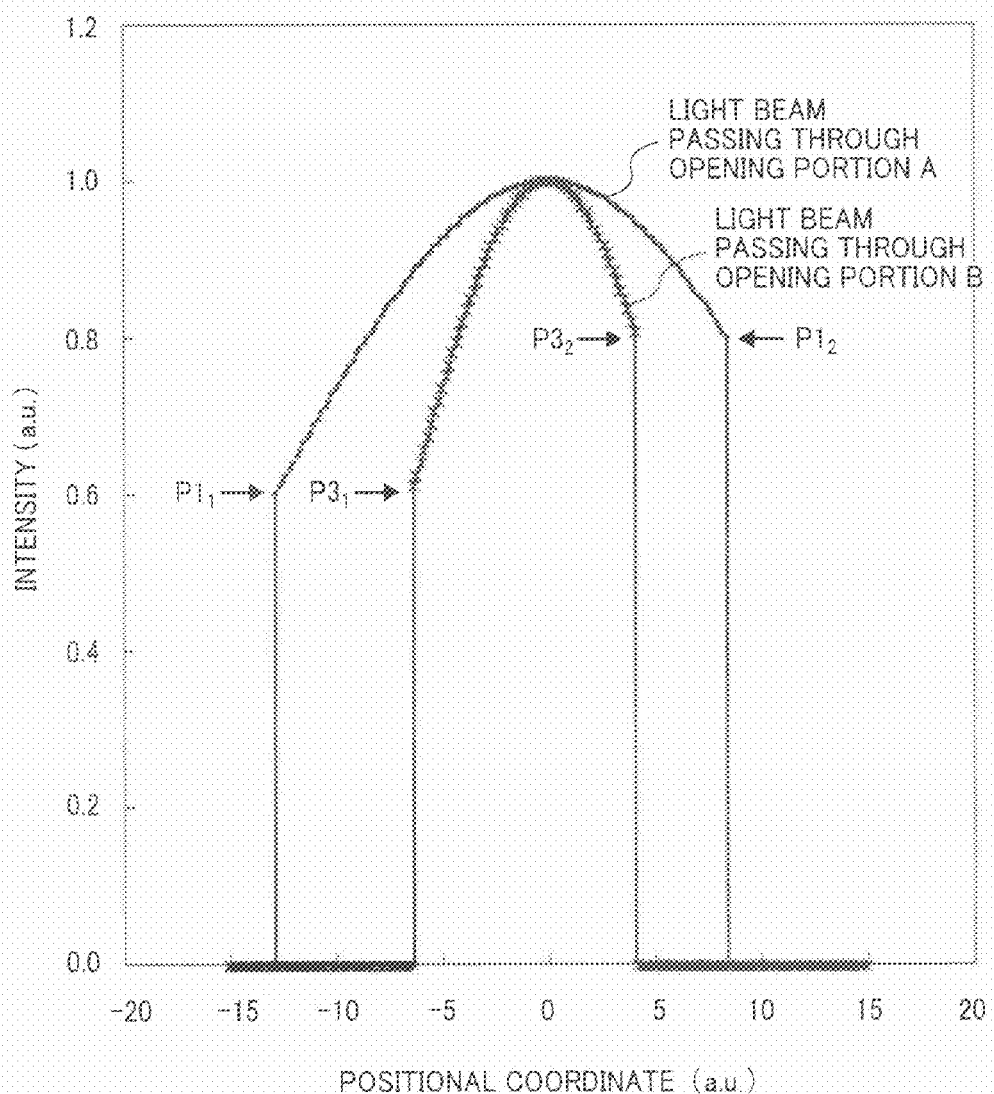
FIG. 15 is a graph of spacial light intensity distribution of a writing light beam and a monitoring light beam in a modified embodiment.

In the embodiment described above, the case where the peak position of the light intensity corresponds to the center of the opening portion is described, but it is not limited thereto. The center of the light beam may be decentered relative to the opening portion, and the peak position of the light intensity may be displaced from the center of the opening portion. In this case, when the horizontal axis represents a positional coordinate in the main-scanning corresponding direction, the light intensities of the light beam passing through the opening portion A at the negative end and at the positive end are indicated by $P1_1$ and $P1_2$, respectively. The light intensities of the light beam passing through the opening portion B at the negative end and at the positive end are indicated by $P3_1$ and $P3_2$, respectively. As illustrated in FIG. 15, all that is required is that the relationships of $P1_1 \approx P3_1$ and $P1_2 \approx P3_2$ are satisfied.

When the horizontal axis represents a positional coordinate in the sub-scanning corresponding direction, the light intensities of the light beam passing through the opening portion A at the negative end and at the positive end are indicated by $P2_1$ and $P2_2$, respectively. The light intensities of the light beam passing through the opening portion B at the negative end and at the positive end are indicated by $P4_1$ and $P4_2$, respectively. In this case, all that is required is that the relationships of $P2_1 \approx P4_1$ and $P2_2 \approx P4_2$ are satisfied.

In the embodiment described above, although the case where each opening portion is a rectangle is described, the opening portion may be an ellipse or other shapes.

In the embodiment described above, each of the first opening plate 14 and the second opening plate 16 may be inclined or curved with respect to the plane orthogonal to the traveling direction of the light beam in order to reduce the feedback light reflected from the opening plate. With this structure, all that is required is that the shape obtained by projecting the opening portion onto the plane orthogonal to the traveling direction of the light beam is set to satisfy the "light intensity equivalence relation".

The case where the coupling lens 13 is rotationally symmetric in the MZ plane is described in the embodiment described above, but it is not limited thereto. For example, when the coupling lens 13 is anamorphic, the shapes of the opening portion A and the opening portion B may be set in consideration of the ratio of an optical power in the M direction and an optical power in the Z-axis direction.

The case where the light beam passing through the coupling lens 13 is a parallel light beam is described in the embodiment described above, but it is not limited thereto.

The case where the two-dimensional array light-emitting device 100 includes forty light-emitting elements is described in the embodiment described above, but it is not limited thereto.

The case where light source 11 includes the two-dimensional array light-emitting device 100 is described in the embodiment described above, but it is not limited thereto. For example, the light source 11 may also include a one-dimensional array in which a plurality of light-emitting elements is arranged in a line instead of the two-dimensional array light-emitting device 100. The light source 11 may also include one light-emitting element instead of the two-dimensional array light-emitting device 100.

The case where the light source device includes a monitoring optical system is described in the embodiment described above, but it is not limited thereto, and at least a part of the monitoring optical system may be provided separately from the light source device.

Figure 16:
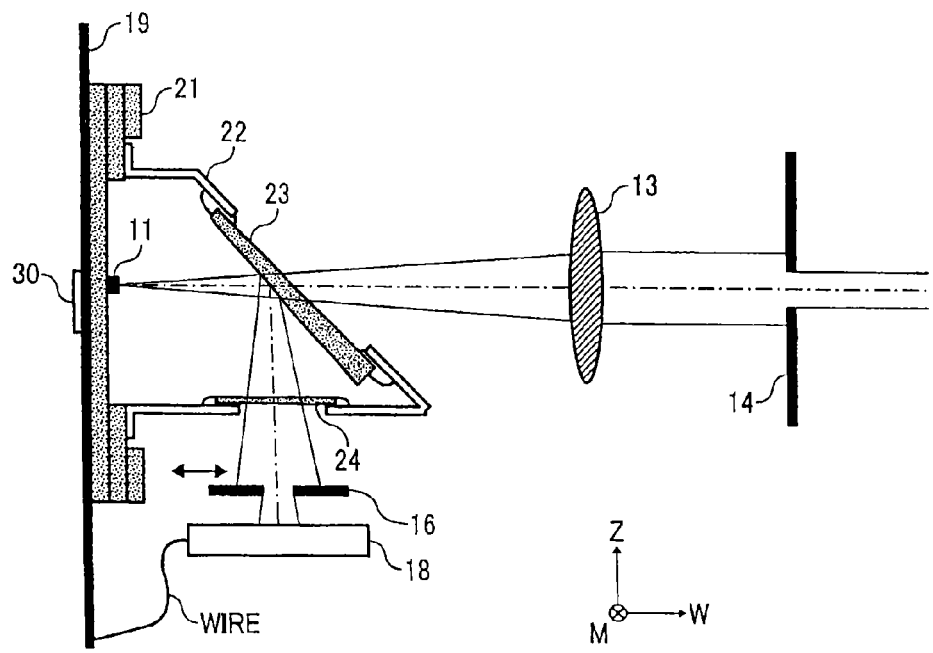
FIG. 16 is a schematic diagram of the light source device in another modified embodiment.

The case where one surface of the half mirror 23 and the other surface thereof are parallel to each other is described in the embodiment described above, but it is not limited thereto. As illustrated in FIG. 16 as one example, one surface of the half mirror 23 may be nonparallel to the other surface thereof. This structure can inhibit interference of the light beam reflected by the incident surface of the half mirror 23 and the light beam reflected by the emitting surface of the half mirror 23 from occurring on the receiving surface of the photoreceptor 18. As a result, detection accuracy of the light amount can be further enhanced. Moreover, this structure can inhibit the light beam repeatedly reflected inside of the half mirror 23 from causing interference on the surface to be scanned. As a result, the light intensity on the surface to be scanned can be further stabilized.

Figure 17:
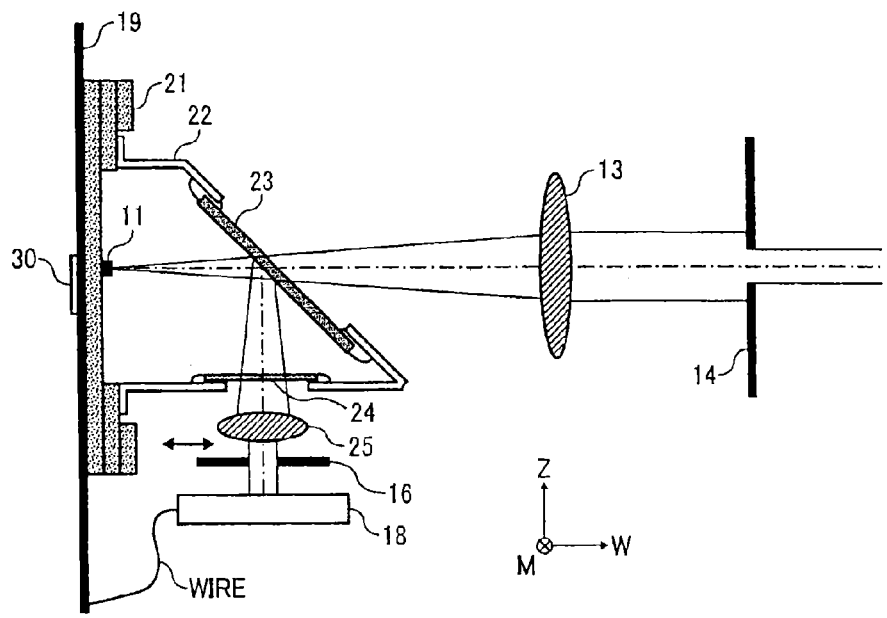
FIG. 17 is a schematic diagram of the light source device in still another modified embodiment.

As illustrated in FIG. 17 as one example, in the embodiment described above, a condensing lens 25 may be arranged between the second opening plate 16 and the transparent member 24. This structure enables the size of the receiving surface of the photoreceptor 18 to be reduced. Moreover, this structure may also include an adjusting mechanism for positioning the condensing lens 25. The adjustment of the position of the condensing lens 25 enables the incidence position and the focus position of a light beam to be adjusted relative to the receiving surface.

Figure 18:
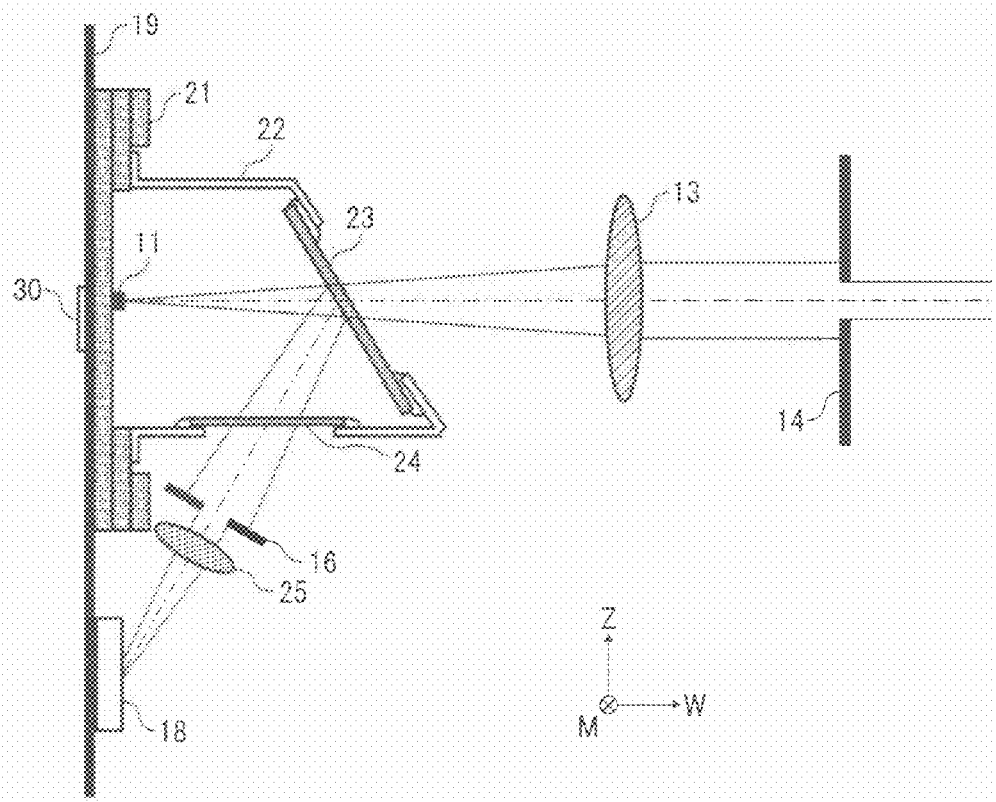
FIG. 18 is a schematic diagram of the light source device in still another modified embodiment.

The case where the surface of the half mirror 23 is inclined 45 degrees with respect to the MZ plane is described in the embodiment described above, but it is not limited thereto. For example, as illustrated in FIG. 18, the inclined angle of the surface of the half mirror 23 with respect to the MZ plane may be smaller than 45 degrees.

With this structure, the photoreceptor 18 can be arranged on the circuit board 19, which eases assembling at the downstream operations. Fluctuation in reflectivity and transmittance of the half mirror 23 resulting from fluctuation in the polarization direction of the light beam output from the light source 11 can be reduced because the incidence angle of the light beam output from the light source 11 on the half mirror 23 becomes small. As a result, light amount detection error among a plurality of light-emitting elements can be reduced. Moreover, the feedback light reflected from the transparent member 24 can be restrained because the plane orthogonal to the traveling direction of the light beam reflected by the half mirror 23 is not parallel to the transparent member 24.

The case where the second opening plate 16 and the photoreceptor 18 are arranged outside of the cap member 22 is described in the embodiment described above, but it is not limited thereto. The second opening plate 16 and the photoreceptor 18 may also be arranged inside of the cap member 22. This structure can enhance the dust resistance of the photoreceptor 18.

The case where the image forming apparatus is the laser printer 1000 is described in the embodiment described above, but it is not limited thereto. To put it briefly, the image forming apparatus may at least include the optical scanning device 1010.

For example, the image forming apparatus may be an image forming apparatus directly radiating laser light onto a medium (such as paper) coloring by the laser light.

The image forming apparatus may be an image forming apparatus in which a silver-salt film is used as an image carrier. In this case, a latent image is formed on the silver-salt film by optical scanning, and the latent image can be visualized by a process same as a development process in a common silver halide photography process. The image can be transferred onto photographic paper by a process same as a printing process in a common silver halide photography process. Such image forming apparatuses can serve as an optical platemaking device or an optical drawing device for drawing CT scan images or the like.

Figure 19:
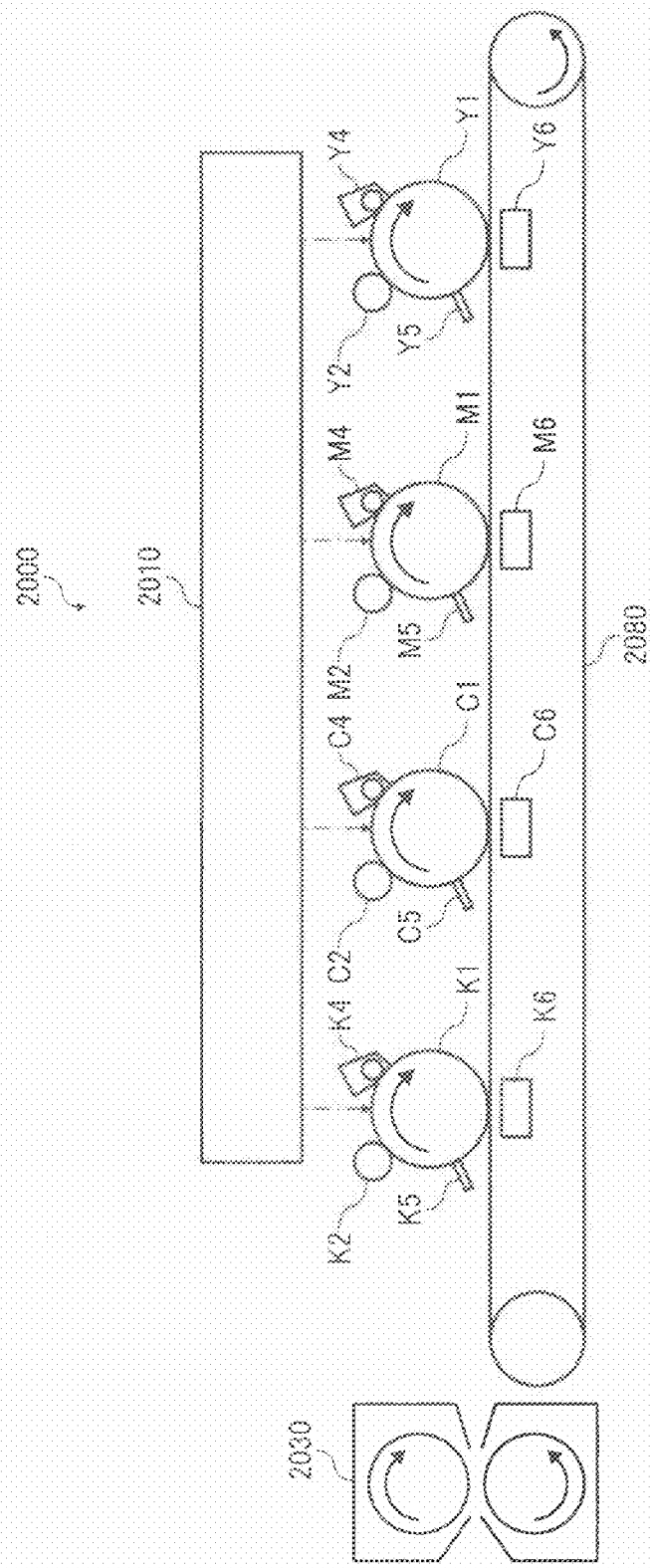
FIG. 19 is a schematic diagram of a color printer in still another modified embodiment.

For example, as illustrated in FIG. 19, the image forming apparatus may be a color printer 2000 including a plurality of photosensitive drums.

The color printer 2000 is a tandem multiple color printer that forms images in full color by superimposing four colors (black, cyan, magenta, and yellow). The color printer 2000 includes: for example, "a photosensitive drum K1, a charging unit K2, a developing unit K4, a cleaning unit K5, and a transfer unit K6" for black; "a photosensitive drum C1, a charging unit C2, a developing unit C4, a cleaning unit C5, and a transfer unit C6" for cyan; "a photosensitive drum M1, a charging unit M2, a developing unit M4, a cleaning unit M5, and a transfer unit M6" for magenta; "a photosensitive drum Y1, a charging unit Y2, a developing unit Y4, a cleaning unit Y5, and a transfer unit Y6" for yellow; an optical scanning device 2010, a transfer belt 2080, and a fixing unit 2030.

The photosensitive drums rotate in the corresponding arrow directions in FIG. 19. The charging unit, the developing unit, the transfer unit, and the cleaning unit are arranged around each photosensitive drum in its rotation direction.

Each of the charging units uniformly charges the surface of the corresponding photosensitive drum. The optical scanning device 2010 optically scans the surface of each photosensitive drum charged by the charging unit to form a latent image on the photosensitive drum.

The corresponding developing unit forms a toner image on the surface of the photosensitive drum. Subsequently, the corresponding transfer unit sequentially transfers the toner image in each color onto a recording sheet on the transfer belt 2080, and finally, the fixing unit 2030 fixes the image on the recording sheet.

The optical scanning device 2010 includes a light source device similar to the light source device 10 for each color. Accordingly, the optical scanning device 1010 can obtain effects similar to those obtained in the optical scanning device 1010.

As a result, the color printer 2000 can obtain effects similar to those obtained in the laser printer 1000.

Although the tandem multiple color printer may cause color deviation in each color due to factors related to machine accuracy or the like, accuracy in correcting color deviation in each color can be enhanced by selecting the light-emitting element to be lighted.

The color printer 2000 may include an optical scanning device per color or per two colors.

As described above, this structure enables the light source device to be downsized and to emit a stable light beam.

This structure can downsize the optical scanning device without lowering the scanning accuracy.

This structure can downsize the image forming apparatus without lowering the image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A light source device comprising:
   a light source;
   a package member that holds the light source;
   a splitting element that is arranged on an optical path of a light beam output from the light source and splits the light beam into a first light beam and a second light beam; and
   a cap member that holds the splitting element so that the surface of the splitting element is inclined with respect to a plane orthogonal to a traveling direction of the light beam output from the light source and that is attached to the package member to seal the light source, the cap member including a first window provided in the traveling direction of the light beam output from the light source through which the first light beam passes and a second window provided in a vertical direction orthogonal to the traveling direction of the light beam output from the light source through which the second light beam passes, one of the first window or the second window being covered by the splitting element;

a first opening plate that is arranged on an optical path of the first light beam passing through the first window, has a first opening portion, and forms the first light beam; and a second opening plate that is arranged on an optical path of the second light beam passing through the second window, has a second opening portion, and forms the second light beam, wherein relationships P1≈P3 and P2≈P4 are satisfied where:

in spacial light intensity distribution of a light beam passing through the first opening portion, P1 indicates a light intensity at an edge of the first opening portion in a first direction relative to a maximum light intensity in a plane orthogonal to a traveling direction of the light beam passing through the first opening portion, the first direction being orthogonal to both the traveling direction of the light beam output from the light source through which the first light beam passes and the vertical direction, and P2 indicates a light intensity at an edge of the first opening portion in a second direction orthogonal to the first direction relative to the maximum light intensity in the plane orthogonal to the traveling direction of the light beam passing through the first opening portion, the second direction being parallel to the vertical direction, and in spacial light intensity distribution of a light beam passing through the second opening portion, P3 indicates a light intensity at an edge of the second opening portion in a direction corresponding to the first direction relative to a maximum light intensity in a plane orthogonal to a traveling direction of the light beam passing through the second opening portion, and P4 indicates a light intensity at an edge of the second opening portion in a direction corresponding to the second direction relative to the maximum light intensity in the plane orthogonal to the traveling direction of the light beam passing through the second opening portion.

2. The light source device according to claim 1, further comprising:

a first optical system that is arranged on an optical path between the light source and the first opening plate; and a second optical system that is arranged on an optical path between the splitting element and the second opening plate, wherein the first optical system has equal optical powers both in the first direction and the second direction, the second optical system has equal optical powers both in the direction corresponding to the first direction and the direction corresponding to the second direction, and a shape of the first opening portion of the first opening plate and a shape of the second opening portion of the second opening plate are similar to each other.

3. The light source device according to claim 1, further comprising:

a first optical system that is arranged on an optical path between the light source and the first opening plate; and a second optical system that is arranged on an optical path between the splitting element and the second opening plate, wherein the first optical system has equal optical powers both in the first direction and the second direction, the second optical system has equal optical powers both in the direction corresponding to the first direction and the direction corresponding to the second direction, and a shape obtained by projecting the first opening portion of the first opening plate onto the plane orthogonal to the traveling direction of the light beam passing through the first opening portion and a shape obtained by projecting the second opening portion of the second opening plate onto the plane orthogonal to the traveling direction of the light beam passing through the second opening portion are similar to each other.

4. The light source device according to claim 1, further comprising a photoreceptor that receives the light beam passing through the second opening portion, wherein the second light beam is a light beam for monitoring a light amount.

5. The light source device according to claim 4, further comprising an opening plate positioning mechanism for positioning the second opening plate.

6. The light source device according to claim 4, further comprising a condensing lens that is arranged on an optical path between the second opening portion and the photoreceptor.

7. The light source device according to claim 6, further comprising a lens positioning mechanism for positioning the condensing lens.

8. The light source device according to claim 1, wherein the splitting element is a plate-like member, and one surface of the splitting element is parallel to the other surface of the splitting element.

9. The light source device according to claim 1, wherein the splitting element is a plate-like member, and one surface of the splitting element is nonparallel to the other surface of the splitting element.

10. An optical scanning device that scans a surface to be scanned with a light beam in a main-scanning direction, the optical scanning device comprising:

the light source device according to claim 1;

a deflector that deflects the light beam output from the light source device; and a scanning optical system that condenses the light beam deflected by the deflector on the surface to be scanned.

11. The optical scanning device according to claim 10, wherein a length of an opening portion of a first opening plate of the light source device in the main-scanning direction is larger than a length of the opening portion in a direction orthogonal to the main-scanning direction, and the splitting element in the light source device is inclined around an axis parallel to the main-scanning direction.

12. An image forming apparatus comprising:

at least one image carrier; and at least one optical scanning device according to claim 10 that scans the at least one image carrier using a light beam modulated according to image information.

13. The image forming apparatus according to claim 12, wherein the image information is multiple color image information.

* * * * *